United States Patent Office 3,547,806
Patented Dec. 15, 1970

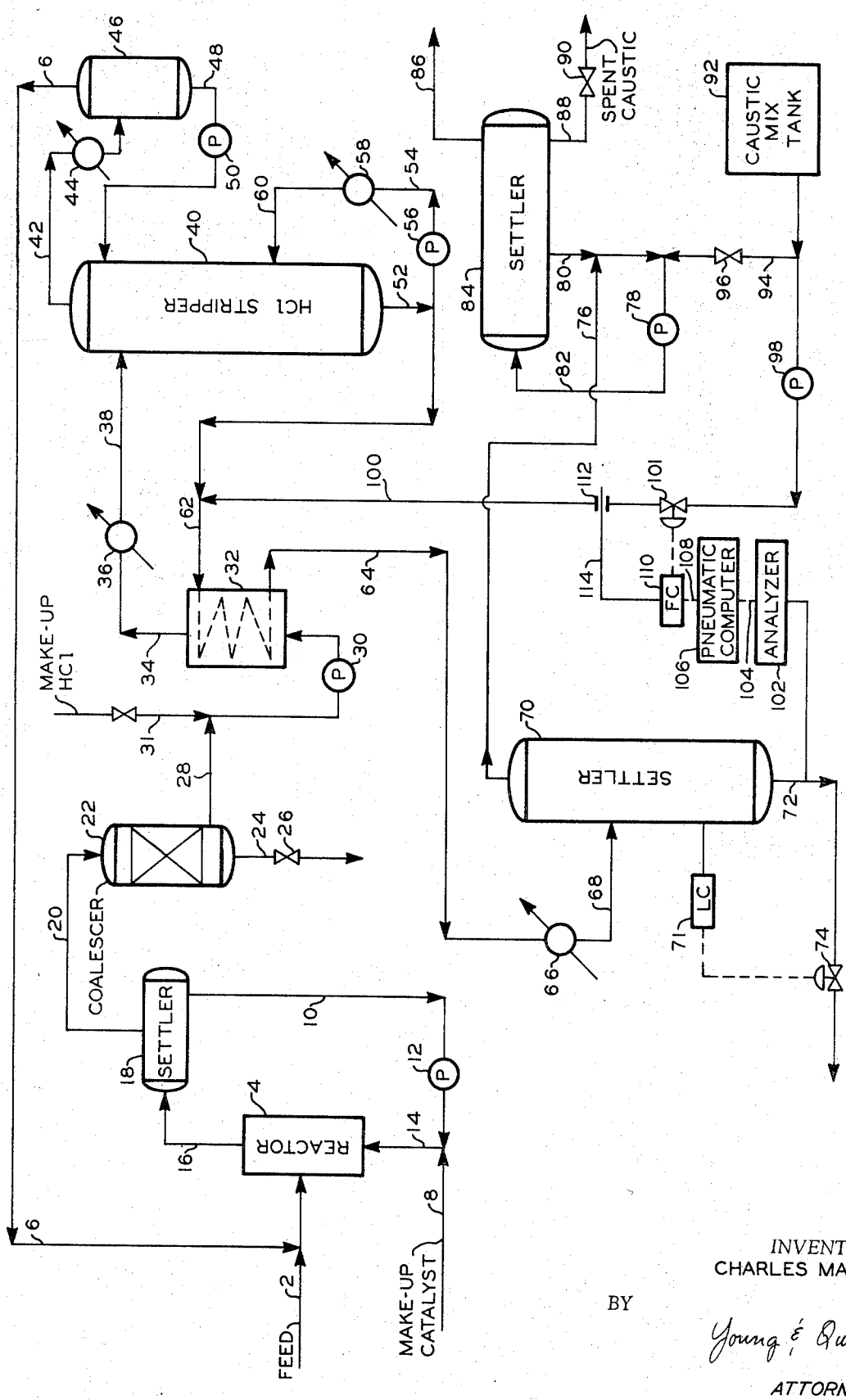

3,547,806
PREVENTION OF CORROSION AND FOULING IN A HYDROCARBON CONVERSION PROCESS
Charles Matyear, Sweeny, Tex., assignor to Phillips Petroleum Company, a corporation of Delaware
Filed Nov. 30, 1967, Ser. No. 687,066
Int. Cl. C10g 9/16, 31/14; C07c 5/28
U.S. Cl. 208—48                       5 Claims

ABSTRACT OF THE DISCLOSURE

In a process for conversion of hydrocarbons with an aluminum halide catalyst complex in the presence of hydrogen chloride where the hydrogen chloride is separated from the converted hydrocarbons in a stripping zone, corrosion by hydrogen chloride and a deposition of aluminum compounds in cooling heat exchangers are minimized by adding aqueous caustic solution to the stripping zone bottoms product stream upstream of the cooling heat exchangers in sufficient quantities to make the bottoms product stream alkaline. The amount of caustic solution added to the stream is controlled responsive to the alkalinity measurement of a downstream sample.

---

This invention relates to an improved process for conversion of hydrocarbons.

In another aspect, this invention relates to an improved process for conversion of hydrocarbons with an aluminum halide catalyst in the presence of hydrogen halide wherein hydrogen halide corrosion of and aluminum compound deposition within process equipment is minimized.

Numerous well-known hydrocarbon processes employ the steps of reacting a hydrocarbon feed with an aluminum halide catalyst, such as aluminum chloride or aluminum chloride-hydrocarbon complex, in the presence of a hydrogen halide promoter, such as hydrogen chloride; stripping the promoter from the reaction effluent; and then washing the distillation bottoms product with an aqueous caustic solution to neutralize at least a major portion of the residual hydrogen chloride and other contaminants therein. Examples of processes of this type include the isomerization of normal hydrocarbons, such as butane, pentane, and hexane to the respective isomers; the isomerization of methyl-cyclopentane to cyclohexane; and the alkylation of various compounds, such as the alkylation of isobutane with ethylene to make diisopropyl (2,3-dimethyl butane).

The amount of aluminum halide employed in this type of process usually exceeds the amount soluble in the hydrocarbon phase of the reaction effluent at the operating conditions in at least some parts of the process. In an effort to remove aluminum halides and aluminum oxide contaminants from the process stream so as to prevent, or at least minimize fouling of the process equipment resulting from deposition of these compounds, various separation techniques have been proposed. These procedures do not adequately purify the stream to eliminate the prospect for the dissolution of aluminum compounds to come out of solution in the stream with resultant equipment fouling at some point downstream in the process.

The stream of bottoms product from the hydrogen chloride stripping step contains these aforementioned aluminum compounds and some residual hydrogen chloride. As this stream is passed through various process equipment between the distillation step and the caustic washing step, such as heat exchangers, valves, etc., the hydrogen chloride therein causes a rapid rate of corrosion and aluminum halide and aluminum oxide crystallize or deposit in some manner on the interior walls of the process equipment, conduits, valves, etc., with various deleterious results such as increased pressure drop, decreased heat transfer efficiency, plugging of valve orifices, etc. This corrosion and deposition requires system shutdowns to clean and/or replace parts of the process equipment, such as heat exchanger tubes.

Accordingly, an object of this invention is to provide an improved process for the conversion of hydrocarbons with an aluminum halide catalyst in the presence of hydrogen chloride wherein corrosion by the hydrogen chloride is minimized.

Another object of this invention is to minimize formation of deposits of aluminum halide and/or aluminum oxide in processing equipment for a process of the aforementioned type.

Other objects and aspects of this invention will become apparent to those skilled in the art from the following detailed description, drawing and appended claims.

According to this invention, in a process for the conversion of hydrocarbons with an aluminum halide catalyst in the presence of hydrogen halide wherein the hydrogen halide is separated from the converted hydrocarbon in a stripping zone, the stream of bottoms product from the stripping zone is contacted with an aqueous caustic (such as NaOH or KOH) solution, in sufficient quantities to make the stream alkaline, upstream of the process equipment susceptible to corrosion and fouling.

Also according to this invention, at least a portion of the caustic solution is separated from the hydrocarbon phase, the alkalinity of the separated solution is measured, and the amount of aqueous caustic solution added to the bottoms product stream is controlled in response to this measurement to maintain the stream in an alkaline condition.

The drawing is a diagrammatic representation of a hydrocarbon isomerization process embodying this invention.

Referring to the drawing, a hydrocarbon stream, such as normal hexane and methylcyclopentane to be isomerized to isomeric paraffinic hexanes and cyclohexane, is introduced into isomerization reactor 4 via conduit 2. Hydrogen chloride, recycled from hydrogen chloride stripper 40, is introduced into reactor 4 through conduit 6. Aluminum chloride complex catalyst is recycled through conduit 10 by pump 12 and is introduced into reactor 4 through conduit 14 along with make-up catalyst which is introduced through conduit 8.

The isomerization of hydrocarbon feed in the presence of a promoter, such as hydrogen chloride, using liquid aluminum chloride-hydrocarbon complex catalyst is well known in the art and, accordingly, this operation will not be described in detail. Generally, it is usually desirable to maintain the reaction mixture within reactor 4 at a temperature within the range of about 90 to 200° F. with the pressure sufficient to maintain liquid phase of the hydrocarbon products therein. A pressure in the order of about 120 to about 300 p.s.i. is usually desirable in carrying out the isomerization of normal hexane and methylcyclopentane to maintain liquid phase of hydrocarbons within the reaction zone.

The reaction zone effluent is removed from reactor 4 and passed through conduit 16 to phase separator or settler 18 wherein undissolved heavier aluminum chloride-hydrocarbon complex catalyst phase separates from the hydrocarbon phase and is recycled to reactor 4 through conduits 10 and 14 by pump 12. The hydrocarbon phase containing hydrogen chloride and entrained as well as some dissolved aluminum chloride catalyst is passed through conduit 20 into coalescer 22 wherein remaining undissolved or suspended fine droplets of aluminum chloride catalyst are coalesced and removed from the system through conduit 24 and valve 26.

A hydrocarbon phase containing hydrogen chloride and dissolved aluminum catalyst complex is passed through conduit 28 and pump 30 into heat exchanger 32 wherein the steam is heated as it passes in indirect heat exchange relationship with the hydrogen chloride stripper bottoms product as described hereinafter. Make-up hydrogen chloride can be added to stream 28 through conduit 31. The heated stream is passed from heat exchanger 32 through conduit 34 to heater 36 wherein the stream is further heated to the desired feed temperature and is charged to hydrogen chloride stripper 40. The heated hydrocarbon stream passes from heat exchanger 36 through conduit 38 to hydrogen chloride stripper 40. In hydrogen chloride stripper 40, which can be a conventional tray tower, hydrogen chloride (along with some hydrocarbon) is separated and passed overhead through conduit 42, condenser 44 and into accumulator 46. A portion of the liquid material in accumulator 46 is recycled through conduit 48 by pump 50 into stripper 40 as reflux. Vaporous hydrogen chloride in accumulator 46 is recycled through conduits 6 and 2 into reactor 4.

The bottoms product of stripper 40 is withdrawn through conduit 52 and a portion thereof is passed through conduit 54 by pump 56 to reboiler heater 58 and recycled to stripper 40 through conduit 60 to provide the necessary heating for stripper 40. The remainder of the bottoms product withdrawn from stripper 40 through conduit 52 is passed through conduit 62 to heat exchanger 32 wherein it is cooled as it passes in indirect heat exchange relationship with the hydrocarbon stream flowing through conduit 34. This bottoms product stream is passed through conduit 64 to cooler 66 where it is cooled further. An aqueous caustic solution flowing through conduit 100 is injected into the bottoms product stream passing through line 62 as described hereinafter to prevent deposits from occurring, particularly in exchangers 32 and 66.

The cooled bottoms product stream passes from cooler 66 through conduit 68 to a small phase separator 70 wherein a portion of the caustic solution containing the neutralized products (sodium chloride from hydrogen chloride, sodium aluminate from aluminum chloride and aluminum oxide) are separated from the stream and removed through conduit 72 and valve 74 for sampling purposes as described hereinafter. The liquid level in settler 70 is maintained constant by liquid level controller 71 which manipulates valve 74 responsive to the liquid level therein. The treated hydrocarbon stream is passed through conduit 76 to the suction side of pump 78 wherein it is mixed with an aqueous caustic (NaOH) circulation stream passing through conduit 80 and passed through conduit 82 to a conventional caustic washing zone settler 84 for removal of any residual hydrogen chloride, catalyst, aluminum compounds and other contaminants. Product, comprising isomeric hexanes and cyclohexanes, is removed through conduit 86 for further processing, such as fractionation into the desired components. Spent caustic solution can be removed from caustic wash zone settler 74 through conduit 88 and valve 90. Make-up caustic solution is supplied to caustic wash zone settler 84 from caustic mix 92 through conduit 94, valve 96 and conduit 82.

Due to the combined effect of the concentration of aluminum chloride-hydrocarbon complex catalyst in the hydrocarbon phase during fractionation in hydrogen chloride stripper 40 and the reduction and temperature of the hydrocarbon phase in the bottoms product stream which occurs in heat exchanger 32 and cooler 66, without this invention, a portion of the dissolved aluminum chloride catalyst precipitates from the hydrocarbon and deposits in heat exchanger 32, cooler 66, process lines and communications therewith, and various other process equipments in these process lines, such as halves. The precipitate aluminum chloride catalyst would deposit on the walls of tubes of the cooler 66 and heat exchanger 32 resulting in the formation of scale deposit which causes increased pressure drop through this process equipment as well as the resultant reduction in heat transfer efficiency. The stripper bottoms product stream 62 also includes hydrogen chloride which would cause rapid corrosion of the various process equipment through which the stream flows upstream of the caustic washing zone 84, e.g., cooler 66, heat exchanger 32, conduits 62, 64, 68, 76, etc.

To minimize these problems in accordance with this invention, an aqueous caustic solution is injected into the stripper bottoms product stream 62 upstream of the affected process equipment through conduit 100. This caustic solution is added in quantities sufficient to at least substantially neutralize the hydrogen chloride and convert the aluminum chloride and aluminum oxide to an alkali aluminate. Preferably, the caustic solution is added in excess of the amount necessary to complete these reactions so that the stream is maintained in an alkaline condition, usually at a pH from 8.5 to about 10. This normally requires a ratio of caustic solution to hydrocarbon to be 5 to 100 gallons of NaOH solution per 100 barrels of hydrocarbon. The aqueous caustic solution comprises caustic soda, NaOH, or other suitable allkaline material, such as potassium hydroxide, which will neutralize the hydrogen chloride and convert the aluminum chloride to an alkali aluminate. Generally, the concentration of the alkaline material in solution will be in the range of about 1 to 25 weight percent, preferably about 5 to 15 weight percent NaOH in water. However, concentrations outside this range can be used with satisfactory results.

The caustic solution can be supplied from a separate source or, as shown in the drawing, can be supplied from the caustic mix tank 92 which supplies the aqueous caustic solution, such as a solution of sodium hydroxide to caustic wash zone 84. The caustic solution will be referred to as an aqueous solution of sodium hydroxide hereinafter for the purpose of description. A sodium hydroxide solution is passed from caustic mix 92 through conduit 100 and valve 101 by pump 98 and is injected into stream 62. The sodium hydroxide solution is introduced into stream 62 by any conventional means which disperses same so as to obtain intimate mixing, such as a sparger, mixing baffles in conduit 62 downstream of conduit 100, or the like.

An automatic alkalinity analyzer, such as Calgon Corporation Chemonitor VA Volumetric Analyzer, samples stream 72 being removed from settler 70 and determines the alkalinity or sodium hydroxide concentration therein on a continuous basis and transmits a signal representative of this determination through a signal line 104 to pneumatic computer 106. Pneumatic computer 106 is a conventional function-fitting device, such as a Foxboro Company M-56 Adding Relay employed as a computer. Pneumatic computer 106 compares the measured concentration of sodium hydroxide in stream 72 with a predetermined value representative of the desired level and transmits a signal representative of this difference via signal line 108 as the set point to flow controller 110. A flow measuring element 112, such as an orifice or turbine meter disposed in conduit 100, measures the rate of flow of sodium hydroxide solution flowing therethrough and a signal representative thereof is transmitted via conventional instrumentation transducers (not shown) and signal line 114 to flow controller 110. Flow controller 110 manipulates valve 101 in response to the difference between the measured flow and the set point value. In this manner, the rate of sodium hydroxide solution added to stream 62 is controlled to maintain the sodium hydroxide concentration therein at the desired level. In order to maintain the bottoms product stream in an alkaline condition and yet prevent the addition of an excessive amount of sodium hydroxide which could produce adverse effects in the process equipment, such as caustic embrittlement, the sodium hydroxide concentration in stream 62 is generally maintained at a level so that the sodium hydroxide concentration in stream 62 is in the range of about 1 to 15 weight percent.

EXAMPLE

In a typical process for isomerizing normal hexane and methyl cyclopentane to isometric paraffinic hexanes and cyclohexanes wherein this invention is employed, the following operating conditions will exist.

Reactor (4):

| | |
|---|---|
| Pressure, p.s.i.g. | 165 |
| Temperature, ° F. | 160 |
| Contact time, hours | .05 |
| Catalyst/hydrocarbon, volume ratio | 1:1 |
| Recycled catalyst (conduit 10), bbls./hr. | 250 |

Feed (Conduit 2):

| | |
|---|---|
| Feed rate, bbls./hr. | 250 |
| Composition, volume percent— | |
| Isohexane | 8 |
| Normal hexane | 53 |
| Methylcyclopentane | 30 |
| Cyclohexane | 9 |

Settler (18):

| | |
|---|---|
| Pressure, p.s.i.g. | 160 |
| Temperature, ° F. | 160 |

HCl stripper (40):

| | |
|---|---|
| Pressure, p.s.i.g. | 190 |
| Temperature, ° F.— | |
| Top | 266 |
| Bottom | 370 |

Bottoms product (conduit 52):

| | |
|---|---|
| Flow rate, bbls./hr. | 250 |
| Composition, volume percent— | |
| Isohexane | 39 |
| Normal hexane | 23 |
| Methylcyclohexane | 9 |
| Cyclohexane | 29 |
| AlCl$_3$, p.p.m. | 400 (range 200–800) |
| HCl, p.p.m. | 50 (range 1 to 200) |
| AlCl$_3$ complex catalyst | Traces as small globules |

Stream temperatures, ° F.:

| | |
|---|---|
| Conduit 38 | 320 |
| Conduit 62 | 370 |
| Conduit 64 | 150 |
| Conduit 68 | 80 |

Aqueous NaOH injection (conduit 100):

| | |
|---|---|
| Feed rate, lbs./hr. as NaOH | 72 |
| NaOH concentration, wt. percent | 15 |

Alkaline sampling stream (conduit 72):

| | |
|---|---|
| Flow rate, gal./hr. | 15 |
| Temperature, ° F. | 80 |
| Range of NaOH concentration, wt. percent | 15 to about 0 |

By maintaining the stripper bottoms product stream passing through various process equipment in an alkaline condition, the hydrogen chloride is neutralized thereby minimizing corrosion. Also, fouling materials which are predominantly aluminum chloride, aluminum oxide, and corrosion products, are dissolved. Plant shutdowns for equipment cleaning necessitated by fouling and for parts replacement resulting from corrosion, which can amount to an annual cost as high as $50,000, are virtually eliminated or at least significantly minimized when this invention is employed. By controlling the addition of caustic solution so that excessive amounts are not added to the stripper bottoms product stream in accordance with this invention, deleterious effects on the equipment are eliminated.

As will be evident to those skilled in the art, many variations and modifications can be practiced within the scope and spirit of this invention and it should be understood that the latter is not necessarily limited to the aforementioned discussion.

I claim:

1. In a process for conversion of hydrocarbons with an aluminum halide complex catalyst in the presence of hydrogen chloride where the hydrogen chloride is separated from the converted hydrocarbons in a stripping zone wherein the stripping-zone bottoms product stream comprises the converted hydrocarbons, aluminum compounds, and hydrogen chloride, and wherein the stripping-zone bottoms stream is cooled to a temperature where a portion of the aluminum compounds separate therefrom and deposit on heat exchangers which cool said stream; the improvement comprising adding a stream containing an aqueous caustic solution to the stripping zone bottoms product stream upstream of heat exchangers, which cool said bottoms product stream, in sufficient quantities to make said bottoms product stream alkaline.

2. The process according to claim 1 wherein said caustic solution is an aqueous sodium hydroxide solution having a sodium hydroxide concentration in the range of 1 to 25 weight percent.

3. The process according to claim 1 further comprising separating a stream comprising at least a portion of the caustic solution from said thus contacted stream, sampling said separated stream and determining the alkalinity thereof, producing a signal representative of said alkalinity and controlling the rate of addition of said caustic solution to said bottoms product stream responsive to said signals so as to maintain the alkalinity of said bottoms product stream in a predetermined range.

4. The process according to claim 3 wherein said controlling comprises producing a first signal representative of said alkalinity; comparing said first signal to a predetermined alkalinity level representative of the desired alkalinity in said bottom stream to obtain a first control signal, the magnitude of said first control signal being related to the difference between said first signal and said predetermined alkalinity level; measuring the flow of caustic solution stream and producing a second signal representative of said measured flow; comparing said first control signal with said second signal to obtain a second control signal, the magnitude of said second control signal being related to the difference between said first control signal and said second signal; and adjusting the flow of said stream of caustic solution added to said bottoms product stream responsive to said second control signal.

5. In a process for conversion of hydrocarbons with an aluminum chloride complex catalyst in the presence of hydrogen chloride which includes the steps of passing the reaction mixture comprising said converted hydrocarbon, aluminum chloride and hydrogen chloride to a first settling zone to separate undissolved catalyst therefrom; passing the resulting hydrocarbon phase from said first settling lone to a distillation zone; removing hydrogen chloride as an overhead from said distillation zones; removing a bottoms product stream containing the converted hydrocarbons, dissolved aluminum chloride and residual hydrogen chloride from said distillation zone, cooling said bottoms product stream to a temperature level where a portion of said dissolved aluminum chloride separates therefrom and deposits on the heat exchangers, which cool said bottoms product stream; the improvement which comprises admixing an aqueous solution of sodium hydroxide having a concentration in the range of 1 to 25 weight percent to said bottoms stream at a point upstream of the affected heat exchangers; passing said thus contacted bottoms product stream to a second settling zone wherein at least a portion of the added sodium hydroxide solution is separated therefrom; removing a stream of the separated caustic solution; continuously sampling said stream of separated caustic solution and determining the alkalinity thereof; and controlling the rate of addition of said sodium hydroxide solution responsive to said signal so as to maintain the alkalinity of said bottoms product stream at a predetermined level of alkalinity.

References Cited

UNITED STATES PATENTS

| | | | |
|---|---|---|---|
| 2,452,691 | 11/1948 | Shoemaker | 260—683.5 |
| 2,454,149 | 11/1948 | Franklin et al. | 260—683.77X |
| 2,535,735 | 12/1950 | Groebe et al. | 260—683.4 |
| 2,607,718 | 8/1952 | Suthard | 208—178 |
| 2,753,292 | 7/1956 | Porter et al. | 208—178 |
| 2,964,385 | 12/1960 | Cobb | 208—262X |

DELBERT E. GANTZ, Primary Examiner

G. E. SCHMITKONS, Assistant Examiner

U.S. Cl. X.R.

208—47, 262; 260—683.77